US008606973B1

(12) United States Patent
Cardinell et al.

(10) Patent No.: US 8,606,973 B1
(45) Date of Patent: Dec. 10, 2013

(54) MANAGING MONITORED CONDITIONS IN ADAPTORS IN A MULTI-ADAPTOR SYSTEM

(75) Inventors: Charles S. Cardinell, Tucson, AZ (US);
Steven E. Klein, Tucson, AZ (US);
Ashwani Kumar, Tucson, AZ (US);
John N. McCauley, Tucson, AZ (US);
Todd C. Sorenson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/542,569

(22) Filed: Jul. 5, 2012

(51) Int. Cl.
*G06F 13/20* (2006.01)

(52) U.S. Cl.
USPC .............................................. 710/17; 710/19

(58) Field of Classification Search
None
See application file for complete search history.

(56) References Cited

U.S. PATENT DOCUMENTS

| | | | | |
|---|---|---|---|---|
| 5,793,994 | A * | 8/1998 | Mitchell et al. | 710/105 |
| 5,859,971 | A * | 1/1999 | Bittinger et al. | 709/203 |
| 6,128,762 | A * | 10/2000 | Jadav et al. | 714/766 |
| 6,247,043 | B1 * | 6/2001 | Bates et al. | 709/200 |
| 6,314,439 | B1 * | 11/2001 | Bates et al. | 715/209 |
| 6,446,237 | B1 * | 9/2002 | Menon | 714/800 |
| 6,493,656 | B1 * | 12/2002 | Houston et al. | 702/187 |
| 7,111,084 | B2 * | 9/2006 | Tan et al. | 710/15 |
| 7,296,069 | B2 * | 11/2007 | Nguyen | 709/223 |
| 7,447,225 | B2 * | 11/2008 | Windisch et al. | 370/428 |
| 7,552,445 | B2 * | 6/2009 | Green | 719/318 |
| 7,657,796 | B1 * | 2/2010 | Kaiser et al. | 714/54 |
| 7,694,188 | B2 * | 4/2010 | Raghuraman et al. | 714/47.1 |
| 7,843,906 | B1 * | 11/2010 | Chidambaram et al. | 370/386 |
| 7,854,006 | B1 * | 12/2010 | Andruss et al. | 726/24 |
| 7,930,598 | B2 | 4/2011 | Boyd et al. | |
| 7,996,853 | B2 * | 8/2011 | Bendiksen et al. | 719/328 |
| 8,051,204 | B2 * | 11/2011 | Kai et al. | 709/242 |
| 8,122,121 | B2 * | 2/2012 | Garyfalos et al. | 709/224 |
| 8,161,321 | B2 * | 4/2012 | Zheng et al. | 714/15 |
| 8,170,975 | B1 * | 5/2012 | Qureshi et al. | 706/47 |
| 8,185,527 | B2 * | 5/2012 | Piccinini et al. | 707/732 |
| 2004/0117802 | A1 * | 6/2004 | Green | 719/318 |
| 2009/0183026 | A1 | 7/2009 | Peterson et al. | |
| 2011/0004791 | A1 * | 1/2011 | Kokubu et al. | 714/57 |
| 2012/0278478 | A1 * | 11/2012 | Fujino | 709/224 |

* cited by examiner

*Primary Examiner* — Cheng-Yuan Tseng
(74) *Attorney, Agent, or Firm* — David W. Victor; Konrad Raynes Davda & Victor LLP

(57) ABSTRACT

Provided are a method, system, and computer program product for managing monitored conditions in adaptors. An adaptor detects a condition comprising one of a plurality of monitored conditions and determines whether the detected condition is indicated on a recent condition list indicating conditions detected at the adaptors. The adaptor communicates the detected condition to cause the detected condition to be included in the recent condition list available at the adaptors in response to determining that the detected condition is not indicated in the recent condition list. Further, a system receives from one of the adaptors indication of a detected condition comprising one of a plurality of monitored conditions that is not indicated on a recent condition list. The received indicated condition is added to the recent condition list to produce an updated recent condition list. Transmission is caused of the updated recent condition list to the adaptors.

27 Claims, 4 Drawing Sheets

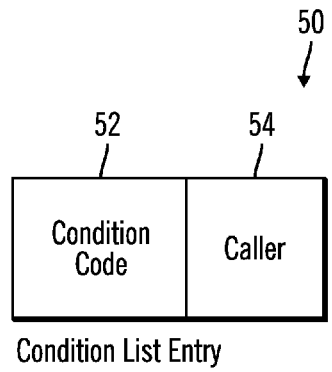
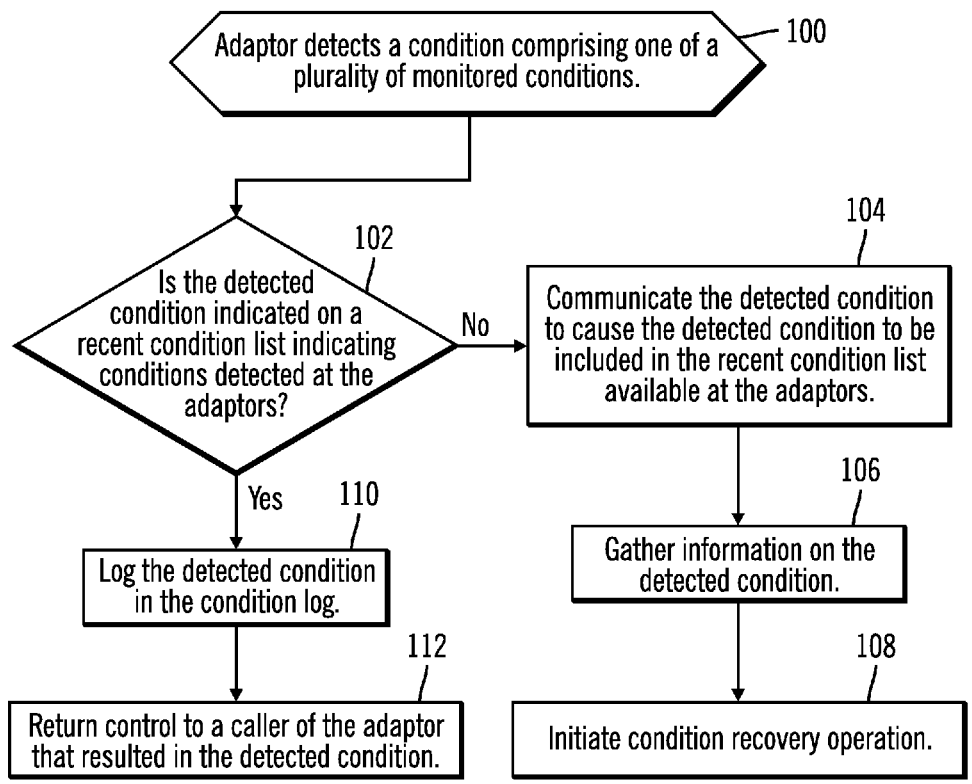

MANAGING MONITORED CONDITIONS IN ADAPTORS IN A MULTI-ADAPTOR SYSTEM

BACKGROUND OF THE INVENTION

1. Field of the Invention

The present invention relates to a computer program product, system, and method for determining priorities for managing monitored conditions in adaptors in a multi-adaptor system.

2. Description of the Related Art

In a high availability multi-adaptor system, the system may provide multiple paths to connected hosts through ports in the multiple adaptors. The system may include one or more processors, such as in a symmetrical multi-processing (SMP) system, to manage the multiple adaptors. If the adaptors detect conditions and errors, then the system needs to capture data on the conditions to troubleshoot. Error and condition recovery operations may interfere with host Input/Output (I/O) operations because host I/O may be quiesced during the condition recovery operations.

If the same condition occurs at multiple adaptors, then the multiple adaptors may each independently attempt to capture data and perform condition recovery operations which may cause each adaptor to reset or quiesce I/O with the connected hosts. If all adaptors used by a host to connect to the server are independently performing data capture and recovery operations, then the host may lose connection to the server.

In current systems, each adaptor may keep track of conditions that have occurred before to avoid performing multiple recovery and data gathering operations for conditions that repeatedly occur.

There is a need in the art for improved techniques for managing detected conditions at adaptors in a multi-adaptor system.

SUMMARY

Provided are a method, system, and computer program product for managing monitored conditions in adaptors. An adaptor detects a condition comprising one of a plurality of monitored conditions and determines whether the detected condition is indicated on a recent condition list indicating conditions detected at the adaptors. The adaptor communicates the detected condition to cause the detected condition to be included in the recent condition list available at the adaptors in response to determining that the detected condition is not indicated in the recent condition list.

In a further embodiment, a system manages conditions in adaptors in the system connected to at least one host through the adaptors. Indication is received from one of the adaptors of a detected condition comprising one of a plurality of monitored conditions that is not indicated on a recent condition list. The received indicated condition is added to the recent condition list to produce an updated recent condition list. Transmission is caused of the updated recent condition list to the adaptors.

BRIEF DESCRIPTION OF THE DRAWINGS

FIG. 2 illustrates an embodiment of a condition list entry in the recent condition list.

FIG. 3 illustrates an embodiment of operations performed by an adaptor when detecting a monitored condition.

DETAILED DESCRIPTION

Described embodiments provide techniques to manage detected conditions occurring at adaptors in a multi-adaptor system to avoid performing data capture or recovery operations every time a monitored condition is detected that would disrupt communication with attached hosts. With the described embodiments, upon the first occurrence of a detected condition, the condition is indicated in a recent condition list and data capture and recovery operations are performed, even if they may disrupt communication between that adaptor and the host. Upon subsequent occurrences of the condition on any of the adaptors, if the detected condition is indicated on the recent condition list, then the condition is logged and control returned to the caller to handle recovery from the condition. In this way, execution of multiple disruptive condition recovery operations, such as data capture, performed for the same detected condition is avoided.

Figure 1:
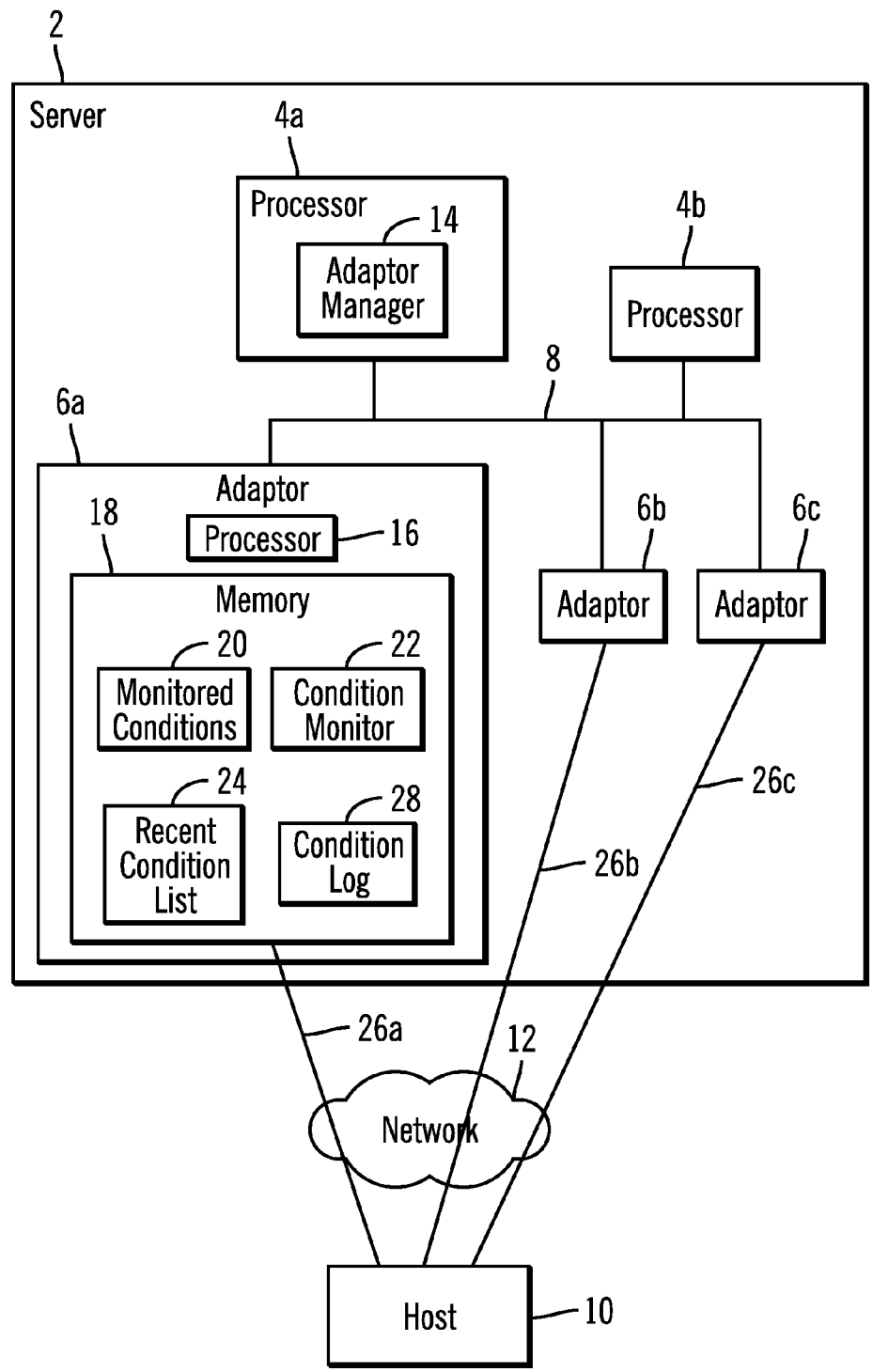
FIG. 1 illustrates a computing environment in which embodiments are implemented.

FIG. 1 illustrates an embodiment of a computing environment having a server 2 including one or more processors 4a, 4b, such as symmetrical multiple processing (SMP) processors, that communicate with adaptors 6a, 6b, 6c over a bus 8. The adaptors 6a, 6b, 6c have ports to connect to hosts 10 over a network 12. The adaptors 6a, 6b, 6c may provide multiple paths 26a, 26b, 26c to communicate with one or more hosts 10 over the network 12. Each processor 4a, 4b may manage a different group of adaptors 6a, 6b, 6c.

Although a specific number of instances of items, such as the server 2, processors 4a, 4b, adaptors 6a, 6b, 6c, host 10 and network 12 are shown, there may be more or fewer instances of these described elements.

Each processor 4a, 4b includes an adaptor manager 14 to manage communication and use of the adaptors 6a, 6b, 6c to communicate over the network 12. Each adaptor 6a, 6b, 6c may include a processor 16 and a memory 18 including program components and data structures processed and executed by the processor 16. The memory 18 includes monitored conditions 20, a condition monitor 22 program, a recent condition list 24 indicating recent monitored conditions detected by the condition monitor 22, and a condition log 28 to log information on conditions detected that are included on the recent condition list 24. In an alternative embodiment, the components of the adaptors 6a, 6b, 6c may be implemented with hardware logic, such as in one more Application Specific Integrated Circuits (ASICs).

The monitored conditions 20 may comprise conditions the adaptors 6a, 6b, 6c detect when processing commands or data from the hosts 10 or from a caller within the server 2, such as one of the processors 4a, 4b or another component. For instance, the adaptor 6a, 6b, 6c may detect an error condition when processing a sequence of commands from a caller or a sequence of packets that result in a path or communication failure. The monitored conditions 20 may result typically in the adaptors 6a, 6b, 6c performing a data capture as well as recovery operation, which may disrupt and disconnect the path 26a, 26b, 26c provided by the adaptor 6a, 6b, 6c to the host 10.

The server 2 may comprise a server class enterprise computing device capable of servicing requests from multiple connected hosts 10. The hosts 10 may comprise a desktop computer, server, host, portable computing device, such as a smart phone, tablet computing device, telephony device, laptop computer, portable device capable of being mounted in an automobile, etc. The memory 18 may comprise solid state storage devices (e.g., EEPROM (Electrically Erasable Programmable Read-Only Memory), flash memory, flash disk, Solid State Devices (SSD), storage-class memory (SCM)), electronic memory, etc. The network 12 may comprise a local area network (LAN), storage area network (SAN), wide area network (WAN), a wireless network, the Internet, etc. The network 12 may include wireless network routers and may be part of a cloud computing model.

FIG. 2 illustrates an embodiment of a recent condition list 24 entry 50 as including a condition code 52 and a caller 54, e.g., host 10 or server 2 component, that produced the data or commands that resulted in the adaptor 6*a*, 6*b*, 6*c* realizing the condition 52. Thus, when the condition monitor 22 detects the occurrence of a condition on the monitored conditions 20 list, an entry 50 is added to the recent condition list 24 identifying the detected condition code 52 and the caller 54 that initiated the detected condition.

FIG. 3 illustrates an embodiment of operations performed by the condition monitor 22 in the adaptors 6*a*, 6*b*, 6*c* when detecting a monitored error condition indicated in the monitored conditions 20 list. Upon detecting (at block 100) the monitored condition, the condition monitor 22 determines (at block 102) whether the detected condition is indicated on the recent condition list 24. If not, then the condition monitor 22 may communicate (at block 104) the detected condition to cause the detected condition to be included in the recent condition list 24 available at the adaptors 6*a*, 6*b*, 6*c*. The condition monitor 22 may gather (at block 106) information on the detected conditioned for error recovery purposes and initiate (at block 108) a condition recovery operation. The condition recovery operation may cause the path 26*a*, 26*b*, 26*c* provided by the adaptor 6*a*, 6*b*, 6*c* detecting the condition to disconnect from the host 10.

If (at block 102) the detected condition is indicated on the recent condition list 24, then the condition monitor 22 logs (at block 110) the detected condition in the condition log 28 and returns (at block 112) control to the caller to the adaptor 6*a*, 6*b*, 6*c* that resulted in the detected condition. The caller may then perform error handling for the condition detected by the adaptor 6*a*, 6*b*, 6*c*. The fact that the condition has reoccurred on the same or different adaptors may indicate that the error is originating from the caller and thus needs to be handled by the caller.

With the operations of FIG. 3, the adaptor 6*a*, 6*b*, 6*c* detecting a condition that has already been detected at any of the adaptors 6*a*, 6*b*, 6*c*, as indicated in the recent condition list 24, does not cause data capture or recovery operations that could result in the path 26*a*, 27*b*, 26*c* provided by the adaptor 6*a*, 6*b*, 6*c* from disconnecting to the host 10. Instead, after detecting a condition that has already occurred on one of the adaptors 6*a*, 6*b*, 6*c*, the occurrence of the condition is logged and control returns to the caller to proceed without disrupting the host paths 26*a*, 26*b*, 26*c*. Further, with described embodiments, because the recent condition list 24 is shared among the adaptors 6*a*, 6*b*, 6*c*, the detection of a condition on one adaptor 6*a*, 6*b*, 6*c* that has been detected on any of the adaptors 6*a*, 6*b*, 6*c* would result in the condition being logged at block 110 in FIG. 3. This ensures that the same detected condition detected at all of the adaptors 6*a*, 6*b*, 6*c* providing paths 26*a*, 26*b*, 26*c* to the host 10 does not cause each of the adaptors 6*a*, 6*b*, 6*c* to go into recovery and data capture mode so as to disrupt host 10 access to the server 2.

In an embodiment, where the condition list entry 50 indicates both the condition code 52 and caller 54, the determination of whether the detected condition is on the recent condition list 24 involves checking both the condition and the caller that initiated the detected condition. In this way, a match between a detected condition and the recent condition list 24 would not occur for a detected condition from different callers. In alternative embodiments, the recent condition list 24 may only indicate the condition 52 and not the caller 54, so that one detected condition is indicated on the recent condition list 24 for conditions detected from different callers.

Figure 4:
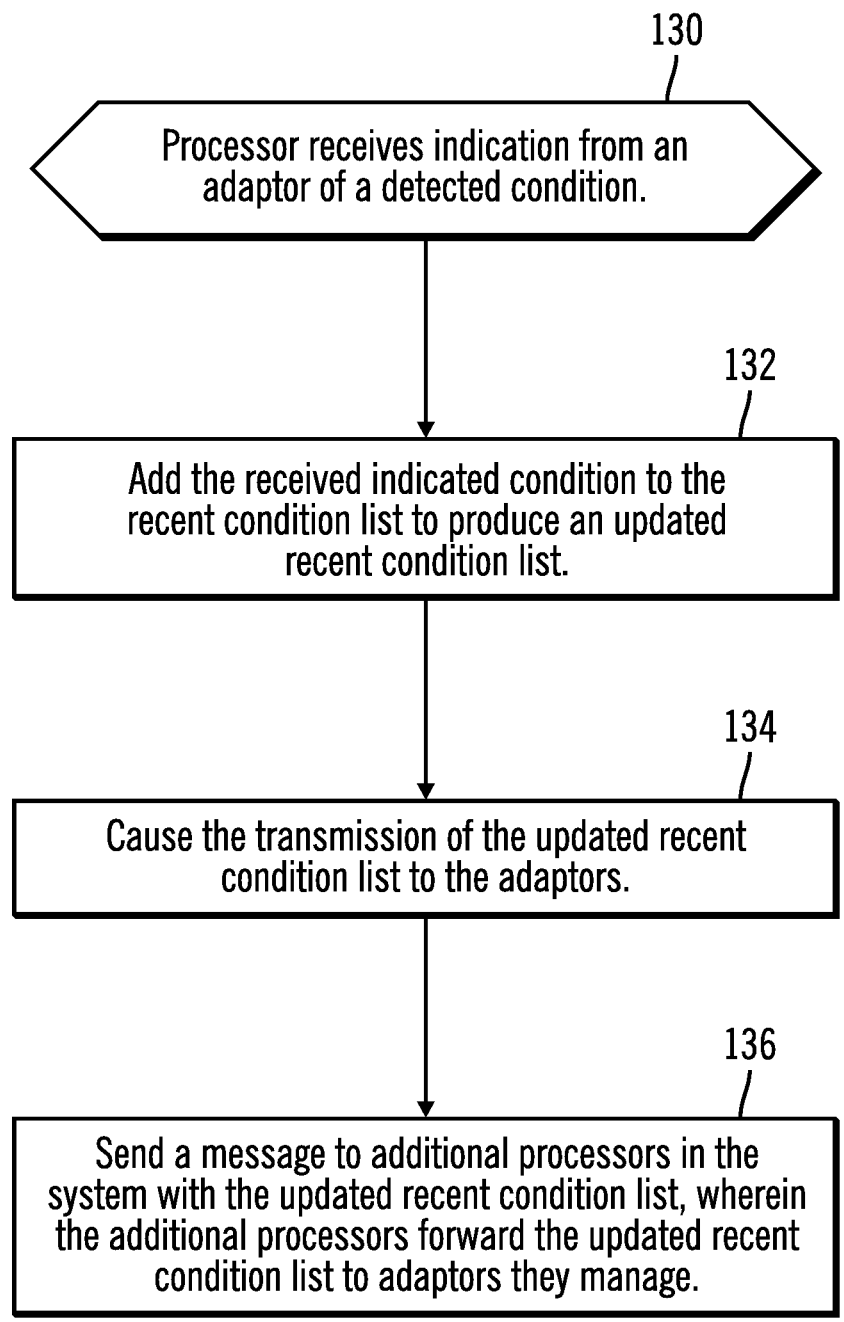
FIG. 4 illustrates an embodiment of operations performed by a processor receiving indication of an adaptor detecting a monitored condition.

FIG. 4 illustrates an embodiment of operations performed by the adaptor manager 14*a*, implemented in the processors 4*a*, 4*b*, to process condition situations at the adaptors 6*a*, 6*b*, 6*c*. Upon receiving (at block 130) indication of a detected condition from one of the adaptors 6*a*, 6*b*, 6*c*, the adaptor manager 14 adds (at block 132) an entry 50 (FIG. 2) for the received indicated condition to the recent condition list 24 to produce an updated recent condition list. The adaptor manager 14 then causes (at block 134) the transmission of the updated recent condition list to the adaptors 6*a*, 6*b*, 6*c* to store and maintain as the recent condition list 24. Further, in a multi-processor system, where additional processors may manage additional adaptors, the adaptor manager 14 may send (at block 136) a message to additional processors 4*a*, 4*b* in the server 2 with the updated recent condition list, wherein the additional processors forward the updated recent condition list to adaptors they manage.

In one embodiment, the adaptor manager 14 may cause the transmission of the updated recent condition list to the adaptors by sending the updated recent condition list directly to all the adaptors 6*a*, 6*b*, 6*c*. In an alternative embodiment, the adaptor manager 14 may cause the transmission by sending the updated recent condition list to the adaptor 6*a*, 6*b*, 6*c* that sent indication of the detected condition so that the adaptor 6*a*, 6*b*, 6*c* detecting the condition would then propagate the updated recent condition list to the adaptors 6*a*, 6*b*, 6*c* on another processor, e.g., 4*b*. In a further embodiment, the adaptor manager 14 may send the updated recent condition list to the other set of adaptors 6*a*, 6*b*, 6*c*, on the same and/or another processor 4*a*, 4*b*, that performs an adaptor cold start, e.g., an Initial Microcode Load (IML), cold boot, code load, etc. In a yet further embodiment, if an adaptor 6*a*, 6*b*, 6*c* performs a warm start, such as the result of the condition recovery operation, then the adaptor manager 14 will forward the updated recent condition list 24 to the restarting adaptor 6*a*, 6*b*, 6*c* and then the restarting adaptor will send the list to all other adaptors owned by the processor 4*a*, 4*b* managing the restarting adaptor. Yet further, the adaptor manager 14 may send the updated recent condition list 24 to a new adaptor that is added to the server 2 when the new adaptor is initialized.

In one embodiment, the adaptor manager 14 may periodically send a command to the adaptors 6*a*, 6*b*, 6*c* to clear the recent condition list 24 to be empty with no condition list entries 50. The adaptor manager 14 may send the command to clear the recent condition list 24 after expiration of a time period, e.g., 24 hours, or in response to an event or condition.

Described embodiments provide techniques to manage detected conditions occurring at adaptors 6*a*, 6*b*, 6*c* in a multi-adaptor system to avoid performing data condition recovery operations, such as data capture, every time a monitored condition is detected that would disrupt communication with attached hosts. With the described embodiments, upon the first occurrence of a detected condition, the condition is indicated in a recent condition list and error recovery performed. Upon subsequent occurrences of the condition on any of the adaptors, if the detected condition is indicated on the recent condition list, then the condition is logged and control returned to the caller to handle error recovery. In this way, execution of multiple disruptive condition recovery operations performed for the same detected condition that could cause all the adaptors to independently disconnect from the host 10 is avoided.

Figure 5:
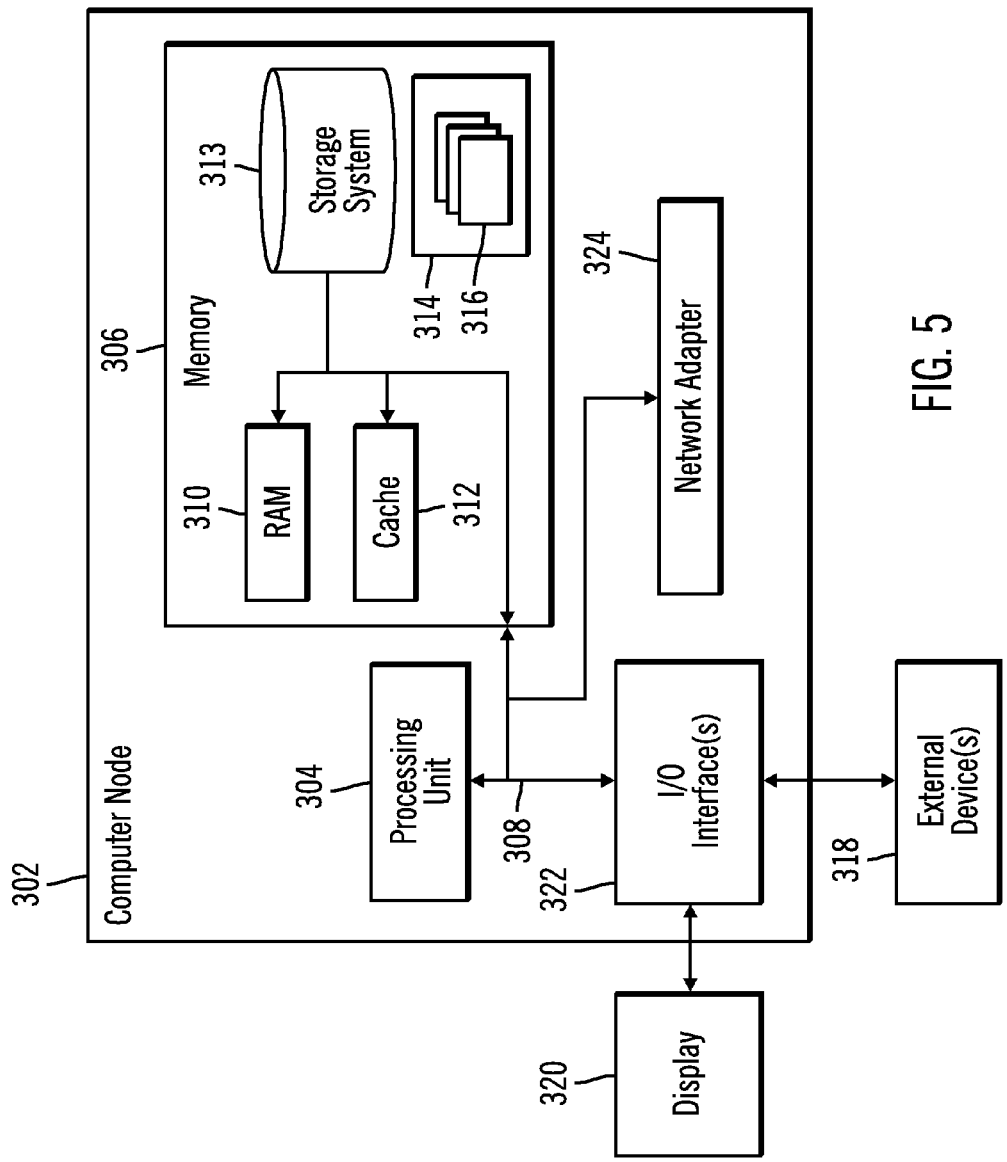
FIG. 5 an implementation of a computer/server node in the network computing environment.

FIG. 5 illustrates an embodiment of a computing node or computer 302 in the network 12 which may comprise an implementation of the server 2, the processors 4*a*, 4*b*, the adaptors 6*a*, 6*b*, 6*c*, and the hosts 10. Computer 302 is only one example of a computing node and is not intended to suggest any limitation as to the scope of use or functionality of embodiments of the invention described herein. Regardless, computing node 302 is capable of being implemented and/or performing any of the functionality set forth hereinabove.

The computer 302 is operational with numerous other general purpose or special purpose computing system environments or configurations. Examples of well-known computing systems, environments, and/or configurations that may be suitable for use with computer system/server 302 include, but are not limited to, personal computer systems, server computer systems, thin sources, thick sources, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer 302 may be described in the general context of computer system executable instructions, such as program modules, being executed by a computer system. Generally, program modules may include routines, programs, objects, components, logic, data structures, and so on that perform particular tasks or implement particular abstract data types. Computer system 302 may be practiced in cloud computing environments where tasks are performed by remote processing devices that are linked through a communications network. In a distributed cloud computing environment, program modules may be located in both local and remote computer system storage media including memory storage devices.

As shown in FIG. 5, computer 302 is shown in the form of a general-purpose computing device. The components of computer 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein.

Computer 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing conditions in an adaptor in a system having a plurality of adaptors to connect to at least one host, the computer program product comprising a computer readable storage medium in one of the adaptors having computer readable program code embodied therein that executes to perform operations, the operations comprising:
   detecting a condition comprising one of a plurality of monitored conditions;
   determining whether the detected condition is indicated on a recent condition list indicating conditions detected at the adaptors; and
   communicating the detected condition to cause the detected condition to be included in the recent condition list available at the adaptors in response to determining that the detected condition is not indicated in the recent condition list.

2. The computer program product of claim 1, wherein the operations further comprise:
   in response to determining that the detected condition is not indicated in the recent condition list, performing:
   gathering information on the detected condition; and
   initiating a condition recovery operation.

3. The computer program product of claim 2, wherein the initiated condition recovery operation causes the adaptor to disconnect from the at least one attached host.

4. The computer program product of claim 1, wherein the operations performed in response to determining that the condition is indicated in the recent condition list comprises:
   logging the detected condition in an information log; and
   returning control to a caller of the adaptor that resulted in the detected condition.

5. The computer program product of claim 1, wherein communicating the detected condition comprises:
   adding the detected condition to the recent condition list to produce an updated recent condition list; and
   transmitting the updated recent condition list to other adaptors of the plurality of the adaptors.

6. The computer program product of claim 1, wherein communicating the detected condition comprises:
   communicating the detected condition to a processor in the system to cause the processor to transmit an updated recent condition list to the adaptors in the system.

7. The computer program product of claim 1, wherein the operations further comprise:
   periodically invalidating the recent condition list to replace with a new recent condition list having no indicated conditions.

8. The computer program product of claim 1, wherein communicating the detected condition comprises:
   communicating the detected condition to a processor in the system;
   receiving from the processor an updated recent condition list indicating the detected condition; and
   transmitting the updated recent condition list to other of the adaptors.

9. A computer program product for managing conditions in adaptors in a system connected to at least one host through the adaptors, the computer program product comprising a computer readable storage medium having computer readable program code embodied therein that executes to perform operations, the operations comprising:
   receiving indication from one of the adaptors of a detected condition comprising one of a plurality of monitored conditions that is not indicated on a recent condition list;
   adding the received indicated condition to the recent condition list to produce an updated recent condition list; and
   causing a transmission of the updated recent condition list to the adaptors.

10. The computer program product of claim 9, wherein the operations further comprise:
    periodically causing the adaptors to reset their recent condition list to include no entries of detected conditions.

11. The computer program product of claim 9, wherein the operations further comprise:
    detecting a restart of one of the adaptors; and
    sending the updated recent condition list to the restarting adaptor to use.

12. The computer program product of claim 9, wherein the operations further comprise:
    detecting a new adaptor added to the system; and
    sending the updated recent condition list to the new adaptor to use.

13. The computer program product of claim 9, wherein the operations further comprise:
    sending a message to additional processors in the system with the updated recent condition list, wherein the processors forward the updated recent condition list to adaptors they manage.

14. An adaptor in a system having a plurality of adaptors connected to at least one host, comprising:
    a computer readable storage medium including a condition monitor program executed to perform operations, the operations comprising
    detecting a condition comprising one of a plurality of monitored conditions;
    determining whether the detected condition is indicated on a recent condition list indicating conditions detected at the adaptors; and
    communicating the detected condition to cause the detected condition to be included in the recent condition list available at the adaptors in response to determining that the detected condition is not indicated in the recent condition list.

15. The adaptor of claim 14, wherein the operations further comprise:
    in response to determining that the detected condition is not indicated in the recent condition list, performing:
    gathering information on the detected condition; and
    initiating a condition recovery operation.

16. The adaptor of claim 15, wherein the initiated condition recovery operation causes the adaptor to disconnect from the at least one attached host.

17. The adaptor of claim 14, wherein communicating the detected condition comprises:
    adding the detected condition to the recent condition list to produce an updated recent condition list; and
    transmitting the updated recent condition list to other adaptors of the plurality of the adaptors.

18. A system for managing conditions in adaptors connected to at least one host through the adaptors, comprising:
    a processor; and
    a computer readable storage medium having an adaptor manager executed by the processor to perform operations, the operations comprising:

receiving indication from one of the adaptors of a detected condition comprising one of a plurality of monitored conditions that is not indicated on a recent condition list;
adding the received indicated condition to the recent condition list to produce an updated recent condition list; and
causing a transmission of the updated recent condition list to the adaptors.

19. The system of claim 18, wherein the operations further comprise:
detecting a restart of one of the adaptors; and
sending the updated recent condition list to the restarting adaptor to use.

20. The system of claim 18, wherein the operations further comprise:
sending a message to additional processors in the system with the updated recent condition list, wherein the processors forward the updated recent condition list to adaptors they manage.

21. A method for managing conditions in an adaptor in a system having a plurality of adaptors to connect to at least one host, comprising:
detecting a condition comprising one of a plurality of monitored conditions;
determining whether the detected condition is indicated on a recent condition list indicating conditions detected at the adaptors; and
communicating the detected condition to cause the detected condition to be included in the recent condition list available at the adaptors in response to determining that the detected condition is not indicated in the recent condition list.

22. The method of claim 21, wherein the operations further comprise:
in response to determining that the detected condition is not indicated in the recent condition list, performing:
gathering information on the detected condition; and
initiating a condition recovery operation.

23. The method of claim 22, wherein the initiated condition recovery operation causes the adaptor to disconnect from the at least one attached host.

24. The method of claim 21, wherein communicating the detected condition comprises:
adding the detected condition to the recent condition list to produce an updated recent condition list; and
transmitting the updated recent condition list to other adaptors of the plurality of the adaptors.

25. A method for managing conditions in adaptors in a system connected to at least one host through the adaptors, comprising:
receiving indication from one of the adaptors of a detected condition comprising one of a plurality of monitored conditions that is not indicated on a recent condition list;
adding the received indicated condition to the recent condition list to produce an updated recent condition list; and
causing a transmission of the updated recent condition list to the adaptors.

26. The method of claim 25, further comprising:
detecting a restart of one of the adaptors; and
sending the updated recent condition list to the restarting adaptor to use.

27. The method of claim 25, further comprising:
sending a message to additional processors in the system with the updated recent condition list, wherein the processors forward the updated recent condition list to adaptors they manage.

* * * * *